United States Patent [19]

Morris

[11] Patent Number: 4,763,688

[45] Date of Patent: Aug. 16, 1988

[54] RELIEVING VALVE WITH SURGE CONTROL FOR FLUID STORAGE TANK

[75] Inventor: Carrol V. Morris, Cosby, Mo.

[73] Assignee: KCCB, Inc., Kansas City, Mo.

[21] Appl. No.: 29,714

[22] Filed: Mar. 24, 1987

Related U.S. Application Data

[63] Continuation of Ser. No. 867,784, May 27, 1986, abandoned.

[51] Int. Cl.⁴ ............................................. F16K 31/12
[52] U.S. Cl. ..................................... 137/509; 137/498
[58] Field of Search ....................... 137/509; 220/89 A

[56] References Cited

U.S. PATENT DOCUMENTS

| | | | |
|---|---|---|---|
| 2,564,171 | 8/1951 | Page | 220/89 A |
| 3,145,730 | 8/1964 | Presnell | 137/504 X |
| 3,608,581 | 9/1971 | Sweet | 137/509 R |
| 3,756,272 | 9/1973 | Hammond | 137/504 X |
| 3,845,879 | 11/1974 | Dernbach | 220/89 A |
| 3,886,969 | 6/1975 | Shira | 137/509 |
| 4,126,151 | 11/1978 | Bullerdiek | 220/89 A X |
| 4,549,565 | 10/1985 | Short | 220/89 A X |

*Primary Examiner*—Martin P. Schwadron
*Attorney, Agent, or Firm*—Silverman, Cass, Singer & Winburn, Ltd.

[57] ABSTRACT

A relieving valve for a fluid or liquid storage tank to permit release of pressure from inside the tank as necessary. A piston is movable within the valve to open the same to atmosphere as pressure builds up slowly therewithin. Upon occurrence of a sudden or rapid pressure rise in the tank, such as when the fluid therein surges against the valve, a snubber assembly in the valve is moved by said pressure rise to a partially closed position to impede the rate at which pressure can build within the valve and thus increase the time before which the valve opens to atmosphere.

12 Claims, 2 Drawing Sheets

RELIEVING VALVE WITH SURGE CONTROL FOR FLUID STORAGE TANK

This is a continuation of application Ser. No. 867,784 filed May 27, 1986, now abandoned.

BACKGROUND OF THE INVENTION

1. Field of the Invention

This invention relates generally to pressure relief valves for fluid storage tanks and, more particularly, to such a valve which includes a snubber assembly to prevent the valve from opening for a short period of time when the valve is subjected to a sudden or rapid pressure rise, such as occurs in a surge of the fluid retained in such tanks.

2. Description of the Prior Art

Tanks for retaining fluid, particularly flammable or corrosive liquids, commonly are provided with a pressure relief valve so as to limit the internal pressure in the tank to a predetermined value for safety. Under normal conditions when the pressure inside the tank rises slowly as in normal storage of flammable liquids, such valves are opened at a predetermined pressure so as to relieve the excess pressure in the tank by venting to atmosphere. Thereafter, when the pressure inside of the tank is reduced to a safe level, the valve is closed to maintain the tank under desired pressure. Illustrations of prior art pressure relief valves are contained in the following patents:

| U.S. Pat. No.: | |
|---|---|
| 1,893,942 | 3,845,876 |
| 1,942,630 | 3,854,623 |
| 2,016,278 | 3,913,601 |
| 2,847,149 | 3,938,692 |
| 3,186,682 | 3,945,395 |
| 3,580,275 | 3,974,850 |
| 3,365,096 | 4,287,910 |
| 3,744,670 | 4,593,711 |
| 3,757,987 | |
| British Patent: | |
| 1,285,733 | |

In addition to providing such a pressure relief valve for flammable or corrosive liquid tanks, it is desirable to include structure to temporarily prevent or control spillage or release of gases from within the tank in the event of a sudden pressure rise or surge of such liquid. Such surge control structure ideally is operable to maintain the pressure relief valve in closed condition for a short period of time to prevent spillage of the tank contents which normally would occur in prior art valves which do not include such surge control feature. Spillage or release of liquid might occur if a tank is upset or rolled over, such as in an accident, creating a sudden pressure rise resulting from liquid surge.

The valve of the present invention includes structure to impede or slow the rate at which pressure can build within the valve upon sudden pressure rise within the tank and thereby increase the time before which gases or liquid within the tank can escape to atmosphere in the event of such occurrence.

SUMMARY OF THE INVENTION

The invention is characterized by a valve mounted on a tank shell and including passageways and a reduced dimension orifice in a snubber assembly opening from the tank into the valve. A pilot piston is operable in an expansion chamber in the valve between a closed position and an open position in which the tank is vented to atmosphere. Gases retained within the tank which build slowly move into the valve through the passageways in the snubber assembly and fill the expansion chamber to move the piston slowly to its open position. When pressure in the tank is relieved, the gases in the expansion chamber are released back into the tank to permit the piston to return to its initial position by operation of a valve spring so as to close the valve.

The valve functions as a surge control in the event of sudden pressure rise or surge of liquid in the tank. Liquid surging against the valve causes the snubber assembly to move to a partially closed position in which the passageways are blocked and the only path available for movement of liquid into the valve is through the reduced dimension orifice. Surging liquid thereby moves into the expansion chamber at a slowed rate providing for extended time for the chamber to fill and move the piston to its open position. The time for movement of the valve is adjustable by variation of the size of the orifice, the volume of the expansion chamber, and the force of springs which are operable against the valve and the snubber assembly.

DESCRIPTION OF THE PREFERRED EMBODIMENT

Figure 1:
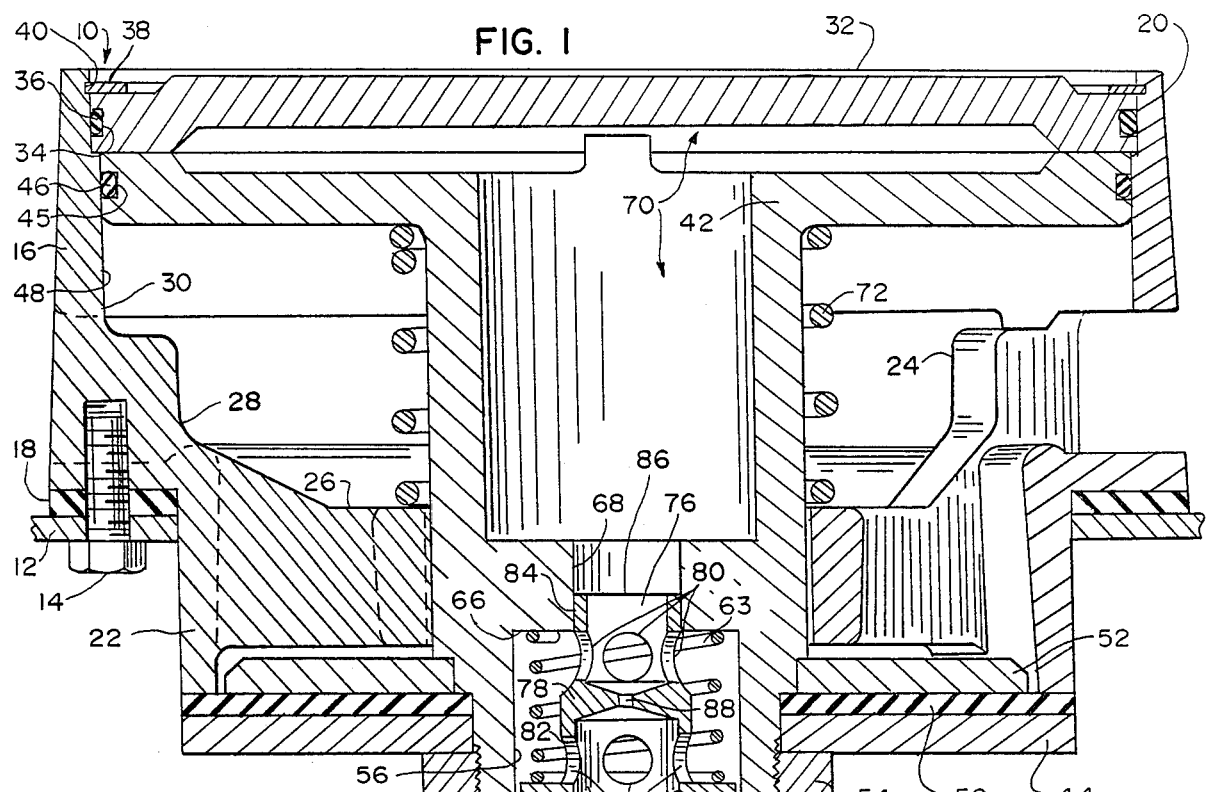
FIG. 1 is a medial sectional view taken through the valve of the invention installed upon a fluid storage tank.

The valve 10 of the invention is shown mounted or installed on the shell 12 of a tank by bolts 14 which pass through apertures in the shell and into threaded openings in the body 16 of the valve. A gasket 18 is positioned between the valve body and the tank shell to seal the installation. Thus, an upper or external portion 20 of valve 10 is disposed outside of the tank and above shell 12 in atmosphere and a lower or internal portion 22 of the valve is disposed within the tank and below shell 12.

External portion 20 of valve 10 includes vent openings 24 which, when the valve is moved to its opened position described below, permit gases and liquid from within the tank to move to atmosphere.

Valve body 16 includes a centrally located hut 26 with radial supports 28 extending to peripheral wall 30. Upper external portion 20 is closed by cap 32 having a peripheral groove 34 for retaining an O-ring 36 to seal the cap within the upper external portion. Cap 32 is retained within portion 20 by retaining ring 38 which seats in groove 40 provided in portion 20.

A piston 42 with poppet 44 is positioned within the valve body 16. Piston 42 is formed with a peripheral groove 45 for retaining an O-ring 46 to seal the piston against the inner-facing surface 48 of upper portion 20. Poppet 44 is positioned upon the lower end 49 of piston 42 adjacent gasket 50 which is maintained in contact with poppet 44 by gasket retainer 52. Poppet 44 is rigidly secured to piston 42 against gasket 50 and retainer 52 by retaining nut 54 threadedly engaged upon the lower end 49 of piston 42.

Lower end 49 of piston 42 is formed with a chamber 56 within which snubber surge valve assembly 58 is movably positioned. Snubber assembly 58 is retained within chamber 56 by retaining ring 60 which seats in groove 62 formed in the wall of chamber 56. Spring 63 is operable against flange 64 of snubber assembly 58 and shoulder 66 which defines a reduced dimension channel 68 that opens from chamber 56 into piston expansion chamber 70 in the upper portion 20 of valve body 16. Main valve spring 72 is restrained in compression and operable against piston 42 and hub 26 to urge piston 42 into its normally closed position shown in FIG. 1 adjacent cap 32.

Snubber surge valve assembly 58 is formed with two chambers 74, 76 disposed cojacent each other with wall 78 therebetween. Open end 79 of chamber 74 is defined by flange 64 and faces the internal confines of tank shell 12. Passageways 80 are formed in the walls 82, 84 of chambers 74, 76, said passageways opening into chamber 56 in which snubber assembly 58 is retained. Open end 86 of chamber 76 is positioned within channel 68 and faces the internal confines of piston expansion chamber 70. Orifice 88 of lesser cross-sectional dimension than each of passageways 80 is formed within wall 78 between chambers 74,76. There is a single orifice 88 and, for purposes of illustration only, there are four passageways 80 in each chamber 74,76. The number of passageways 80 may be varied, as desired.

The operation of valve 10 is as follows. As pressure rises in the tank during filling or normal temperature variations, gases will move from the tank through open end 79 of chamber 74 in snubber assembly 58, through passageways 80 and orifice 88, into chamber 76 and piston expansion chamber 70 as shown by arrows A in FIG. 2. Increasing pressure in expansion chamber 70 results in forces illustrated by arrows B exerted against piston 42 to move the same downwardly against the force of main valve spring 72 and the tank pressure action against poppet 44. As a result, poppet 44 is opened to permit the gases and liquid in the tank to escape to atmosphere by the pattern shown by arrows C through vent openings 24. When the pressure in the tank is equalized with that of atmosphere, the force of spring 72 returns piston 42 to its closed position adjacent cap 32 as shown in FIG. 1.

Figure 2:
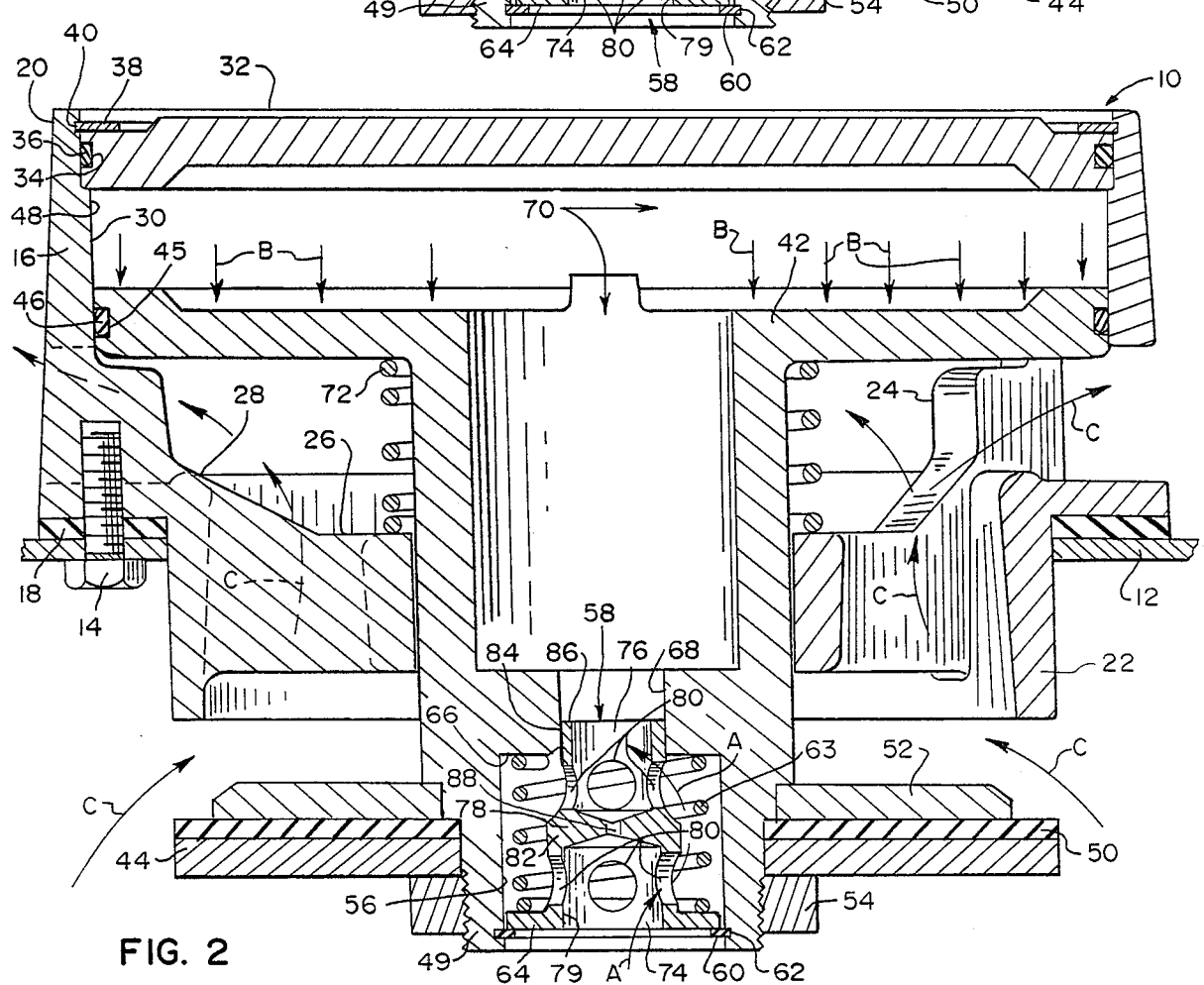
FIG. 2 is a sectional view similar to that of FIG. 1, illustrating the open condition of the valve and the fluid and gas flow pattern during pressure release.

The surface area of piston 42 is greater than that of poppet 44 to facilitate the opening of valve 10 as pressure rises in expansion chamber 70. Thus, the poppet 44 will open as shown in FIG. 2 when the force on piston 42 becomes greater than the combined forces exerted against poppet 44 and that of spring 72. The pressure value required to open valve 10 can be predetermined by designing the force of spring 72 in the closed position of piston 42 (FIG. 1) to be equal to the difference in area of piston 42 and poppet 44 multiplied by the design pressure of the tank.

Figure 3:
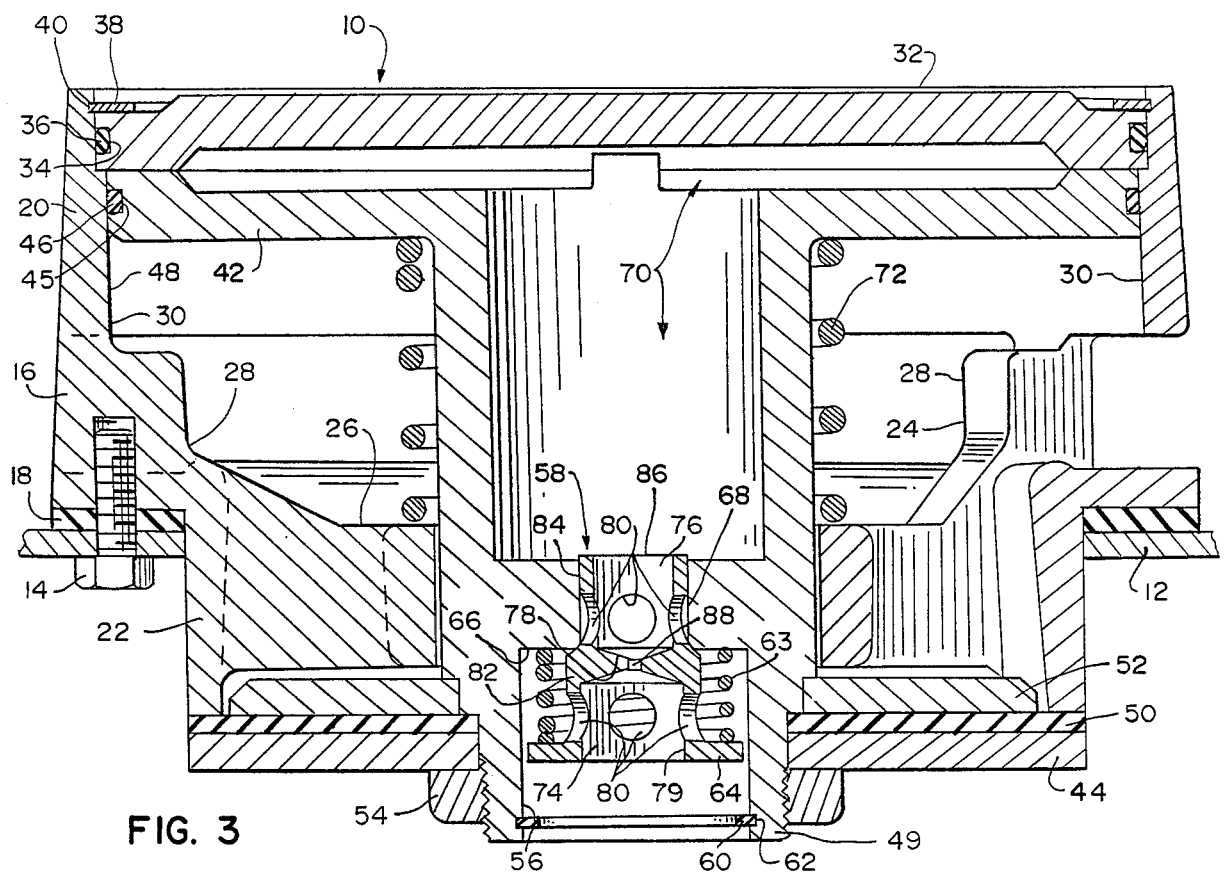
FIG. 3 is a similar sectional view illustrating the surge control condition of the valve.
Figure 4:
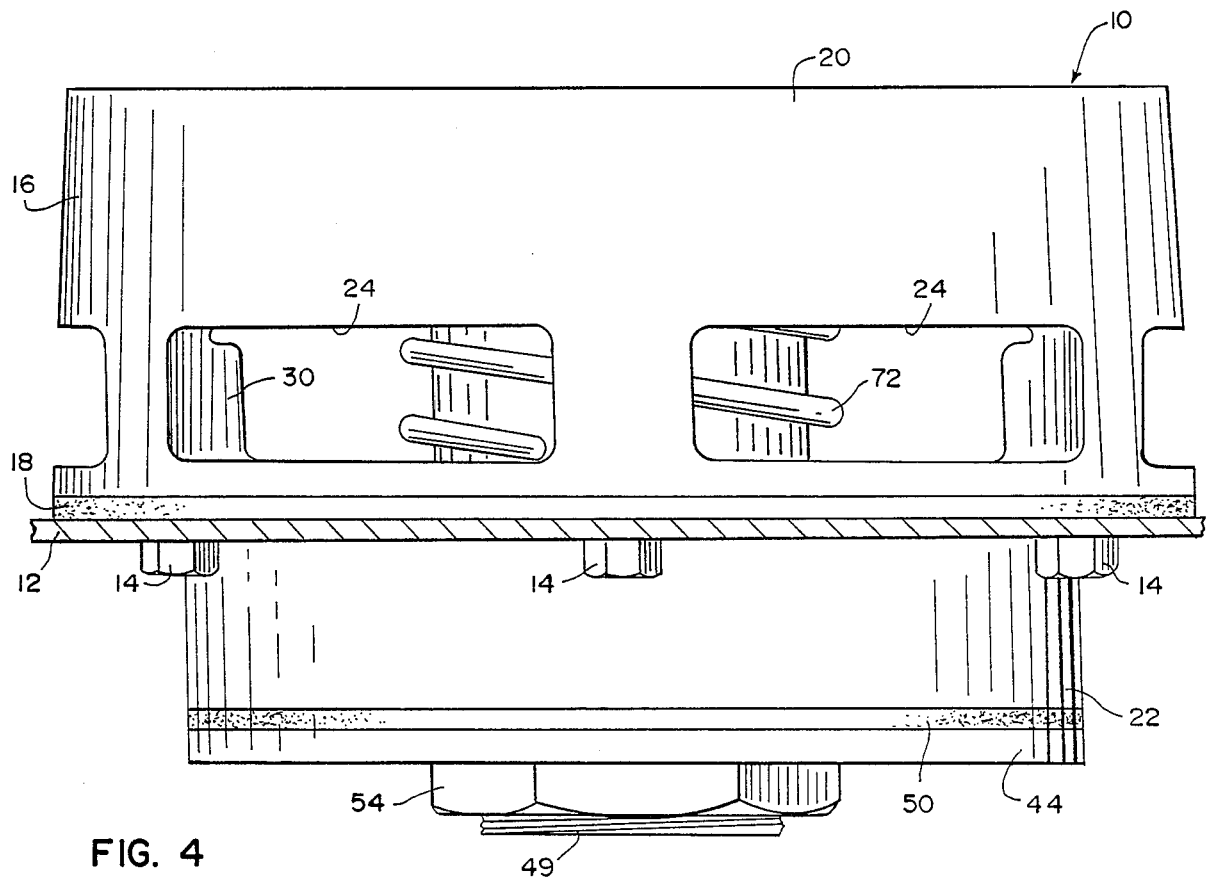
FIG. 4 is a side elevational view of said valve installed upon such a tank.

Valve 10 functions as a surg control in the following manner to prevent the valve from opening for a short time period when the valve is subjected to sudden or rapid pressure rise, such as occurs in a surge. Referring to FIG. 3, when pressure in the tank rises suddenly, snubber surge valve assembly 58 is moved upwardly against the force of spring 63 as seen in the figure with chamber 76 disposed within channel 68 to close off passageways 80 in said chamber 76. As a result, surging liquid and gases can move into piston expansion chamber 70 only through reduced dimension orifice 88, thus slowing the time during which expansion chamber 70 can receive sufficient pressure to cause piston 42 to move downwardly to open position as seen in FIG. 2. As piston 42 moves downwardly, gases and liquid are permitted to escape from the tank in the manner shown in FIG. 2, but the time for this to occur is less than that which takes place under non-surge conditions. The time for the pressure in expansion chamber 70 to rise is controlled by the size of orifice 88, the volume of the expansion chamber, and the forces of springs 72 and 63. Snubber surge valve assembly 58 returns to its position shown in FIGS. 1 and 2 by reason of the force of spring 63 after valve 10 moves to open position (FIG. 2).

It will be appreciated from the above specification that when valve 10 is subjected to steady pressure rise such as occurs in normal operation, the valve will open and maintain the pressure in the tank at a predetermined desired level. When valve 10 is subjected to a sudden pressure rise, such as occurs in a tank when it is overturned, the valve will remain closed a sufficient length of time to prevent spillage of the contained liquid.

Minor variations in the structure and other variations in the arrangement and size of the various parts may occur to those skilled in the art without departing from the spirit or circumventing the scope of the invention as set forth in the appended claims.

I claim:

1. A valve for relieving pressure from within a tank at a predetemrined tank pressure comprising, a housing retained on the tank and having an internal portion disposed within the tank and an external portion disposed outside of the tank in atmosphere and a plurality of vent openings in said portions, a closed expansion chamber in the valve and a pilot piston movable in the expansion chamber between a first position in which the valve is closed and a second position in which the valve is open, a poppet affixed to an end of the piston adjacent the internal portion of the housing operating to close the valve seat when the piston is in said first position and operating to open the valve seat when the piston is in said second position, said piston including a snubber valve chamber opening between said closed expansion chamber and the tank, said chamber having a fluid path separate from the fluid paths between said tank and said vent openings, a separate snubber surge valve assembly for controlling only rapid pressure increases within said tank, said snubber valve being movably retained within said snubber valve chamber, said snubber valve assembly being capable of movement independent of said pilot piston only upon occurrence of a surge or rapid pressure increase and having a plurality of openings therein to permit passage of the contents of the tank therethrough into said closed expansion chamber to cause movement of said piston from said first to said second position following a predetermined time delay after a rapid pressure increase within said tank above said predetermined tank pressure, to vent said tank only through said vent openings and including means for moving said piston from said second to said first position when said tank pressure falls below said predetermined tank pressure.

2. A valve as claimed in claim 1 in which said snubber valve assembly is formed of two chambers disposed cojacent each other with a wall therebetween.

3. A valve as claimed in claim 2 in which said openings include a plurality of passageways formed in the walls of the snubber valve assembly chambers, and an orifice of lesser cross-sectional dimension than each of the passageways formed within the wall between the snubber assembly chambers.

4. A valve as claimed in claim 3 including a channel opening between said snubber valve chamber and said expansion chamber, one of said snubber valve assembly chambers being movable within said channel.

5. A valve as claimed in claim 4 in which said snubber valve assembly is movable between a first position in which the contents of the tank are permitted to move through said passageways and said orifice into said expansion chamber and a second position in which the passageways in said one surge valve assembly chamber are blocked to prevent movement of the contents of the tank therethrough and said contents can move only through said orifice into said expansion chamber.

6. A valve as claimed in claim 5 in which there are four passageways in each snubber valve assembly chamber.

7. A valve as claimed in claim 5 in which said snubber valve assembly is maintained in its first position by a spring engaged against said assembly within the snubber valve assembly chamber.

8. A valve as claimed in claim 7 in which the pilot piston is maintained in its first position by a valve spring engaged against the piston within the valve housing.

9. A valve as claimed in claim 8 in which the surface area of said piston is greater than that of said poppet.

10. A valve as claimed in claim 9 in which the pressure value required to open the valve is determined by the force of said valve spring equal to the difference in the area of the piston surface and poppet surface multiplied by the design pressure of the tank.

11. A valve for relieving pressure from within a tank at a predetermined tank pressure comprising, a housing retained on the tank and having an internal portion disposed within the tank and an external portion disposed outside of the tank in atmosphere and a plurality of vent openings in said portions, a closed expansion chamber in the valve and a pilot piston movable in the expansion chamber between a first position in which the valve is closed and a second position in which the valve is open, a poppet affixed to an end of the piston adjacent the internal portion of the housing operating to close the valve seat when the piston is in said first position and operating to open the valve seat when the piston is in said second position, said piston including a snubber valve chamber opening between said closed expansion chamber and the tank, said chamber having a fluid path separate from the fluid paths between said tank and said vent openings, a separate snubber surge valve assembly for controlling only rapid pressure increases within said tank, said snubber valve being movably retained within said snubber valve chamber, said snubber valve assembly being capable of movement indepenedent of said pilot piston only upon occurrence of a surge or rapid pressure increas and having a plurality of openings therein to permit passage of the contents of the tank therethrough into said closed expansion chamber to cause movement of said piston from said first to said second position following a predetermined time delay after a rapid pressure increase within said tank above said predetermined tank pressure, to vent said tank only through said vent openings and including means for moving said piston from said second to said first position when said tank pressure falls below said predetermined tank pressure, in which said snubber valve assembly is formed of two chambers disposed cojacent each other with a wall therebetween, said openings include a plurality of passageways formed in the walls of the snubber valve assembly chambers, and an orifice of lesser cross-sectional dimension than each of the passageways formed within the wall between the snubber assembly chambers, including a channel opening between said snubber valve chamber and said expansion chamber, one of said snubber valve assembly chambers being movable within said channel, said snubber valve assembly is movable between a first position in which the contents of the tank are permitted to move through said passageways and said orifice into said closed expanison chamber and a second position in which the passageways in said one surge valve assembly chamber are blocked to prevent movement of the contents of the tank therethrough and said contents can move only through said orifice into said closed expansion chamber, said snubber valve assembly is maintained in its first position by biasing measn engaged aganist said assembly within said snubber valve assembly chamber and the pilot piston is maintained in its first position by biasing means engaged against the piston within said valve housing, the surface area of said postion is greater than that of said poppet and the pressure required to open the valve is determined by the force of said pilot piston biasing means equal to the difference in the area of the piston surface and poppet surface multiplied by the design pressure of the tank.

12. An improved tank and valve assembly for relieving pressure within a closed tank at a predetermined internal tank pressure, said improvement comprising, a housing retained on the tank and having an internal portion disposed within the tank and external portion dispose outside of the tank in atmosphere and a plurality of vent openings in said portions, a closed expansion chamber in the valve and a pilot piston movable in the expansion chamber between a first position in which the valve is closed and a second position in which the valve is open, a poppet affixed to an end of the piston adjacent the internal portion of the housing operating to close the valve seat when the piston is in said first position and operating to open the valve seat when the piston is in said second position, said piston including a snubber valve chamber opening between said closed expansion chamber and the tank, said chamber having a fluid path seaprate from the fluid paths between said tank and said vent openings, a separate snubber surge valve assembly for controlling only rapid pressure increases within said tank, said snubber valve being movably retained within said snubber valve chamber, said snubber valve assembly being capable of movement independent of said pilot piston only upon occurrence of a surge or rapid pressure increase and having a plurality of openings therein to permit passage of the contents of the tank therethrough into said closed expansion chamber to cause movement of said piston from said first to said second position after a predetermined time delay following a rapid pressure increase within said tank above said predetermined tank pressure, to vent said tank only through said vent openings and including means for moving said piston from said second to said first position when said tank pressure falls below said predetermined tank pressure.

* * * * *